United States Patent [19]

McKinney

[11] 4,067,749
[45] Jan. 10, 1978

[54] APPARATUS AND METHOD FOR CLEANING AIR FILTER ELEMENTS

[76] Inventor: Lee R. McKinney, 2241 W. Carson Drive, Tempe, Ariz. 85282

[21] Appl. No.: 759,405

[22] Filed: Jan. 14, 1977

[51] Int. Cl.$^2$ .............................................. B08B 5/04
[52] U.S. Cl. ........................................ 134/21; 15/304; 15/345; 55/96; 55/304; 134/22 R; 134/33
[58] Field of Search ................... 134/21, 22 R, 23, 33, 134/37; 15/304, 310, 311, 345; 55/96, 302, 304

[56] References Cited

U.S. PATENT DOCUMENTS

| | | | |
|---|---|---|---|
| 3,936,902 | 2/1976 | Shackleton et al. | 15/304 |
| 3,954,426 | 5/1976 | Brange | 55/96 |
| 3,998,656 | 12/1976 | Grotto | 134/33 |

*Primary Examiner*—S. Leon Bashore
*Assistant Examiner*—George C. Yeung
*Attorney, Agent, or Firm*—Tilton, Fallon, Lungmus & Chestnut

[57] ABSTRACT

An apparatus and method for cleaning air filter elements of the type used in heavy duty internal combustion engines. The apparatus includes a frame to support air filter elements in position for rotation, a blower for forcing air through the filter and the element in a direction opposite the direction of air and dust entering the housing during use of the filter, an agitator operatively associated with the frame for loosening dust which entered the housing during use of the filter, a suction for drawing air through the filter and the element in a direction opposite the direction of air and dust entering the housing during use of the filter, and a pair of rollers to drive the filter element for rotation. The method includes supporting the filter element in position for rotation, forcing air through the filter and the element in a direction opposite the direction of air and dust entering the housing during use of the filter, agitating the filter and the element for loosening dust which entered the housing during use of the filter, drawing air through the filter and the element in a direction opposite the direction of air and dust entering the housing during use of the filter, and driving the filter element for rotation. By utilizing these combinations of features, dust accumulated in the air filter element during use can highly effectively be removed for cleaning the filter with the method and apparatus.

17 Claims, 3 Drawing Figures

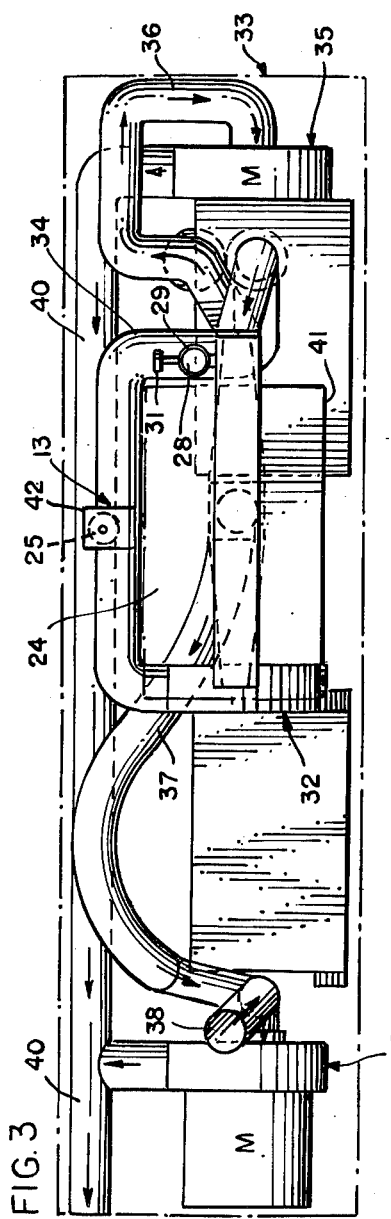
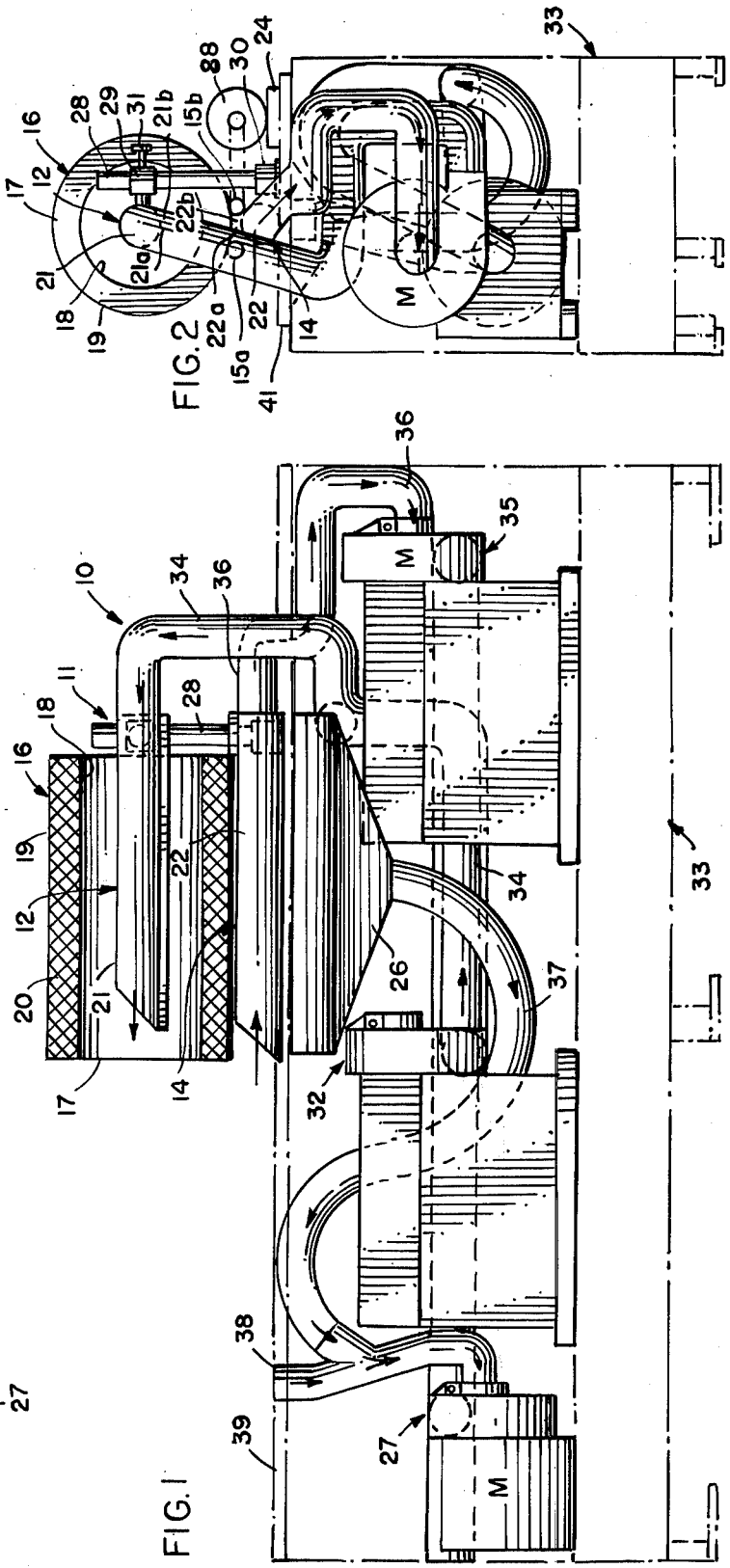

APPARATUS AND METHOD FOR CLEANING AIR FILTER ELEMENTS

BACKGROUND

This invention relates to an apparatus and method for cleaning air filter elements and more particularly to an apparatus and method for loosening and removing dust accumulated in an air filter element after a period of use of the filter.

Dust inducted with air into the cylinders of an internal combustion engine is one of the major causes of short engine life, high fuel consumption and expensive repairs. Once dirt enters the cylinders, it finds its way into the piston ring grooves, oil passages, bearings and other working parts.

The filter elements used in heavy-duty, large scale equipment such as the graders, trucks and other units used in road construction and mining operations are considerably larger and more costly than the air filters commonly used in passenger automobiles and other relatively small vehicles. Because such equipment is customarily exposed to conditions involving high levels of air-borne particulate matter, frequent cleaning or replacement of the filter elements is required in order to prevent engine damage and maintain operating efficiency.

Almost all heavy equipment owners have been faced with one of two alternatives to complete replacement; namely, either wet or dry cleaning and subsequent reinstallation. The owner could send the filters to a commercial washing plant which was effective but expensive requiring replacement of the filters after two or three washings as well as a substantial stock of spare filters. The owner could also attempt to clean the filter elements with a compressed air hose but the filter element was often damaged without any way of assuring that it was clean. With these consequences in mind, the heavy equipment owner found neither wet nor dry cleaning and reinstallation of the filter elements to be entirely satisfactory.

Subsequently, a motor driven vacuum confined to a narrow segment of the filter elements was developed. The air flowed through the filter elements in reverse of the normal flow, spread the pleats, opened the inner folds, and sucked out the collected grit and dirt. Both in-to-out and out-to-in filter elements could be dry cleaned by slowly rotating them relative to the vacuum tapping lightly to dislodge persistent particles.

Since controlled air vacuuming did not hurt the paper filter element, the filters could be cleaned in this manner between 20 to 30 times before discarding. On the other hand, according to industry representatives, when a filter element is washed the first time, it looses approximately 30% of its capacity usually requiring the element to be discarded after three or four launderings. The utility of dry cleaning filter elements has clearly been established in the field leaving those skilled in the art to seek even more effective dry cleaning method and apparatus.

The prior art is exemplified by U.S. Pat. Nos. 3,004,276; 3,373,552; and 3,888,694. Co-owned U.S. Pat. No. 3,004,276 reveals an earlier construction of the dry cleaning type. The present invention represents an improvement upon prior art constructions.

SUMMARY

The present invention is directed to an apparatus for cleaning a generally cylindrical air filter having a housing with concentric inner and outer perforate shell casings and a perforate filter element contained between the casings with an annular arrangement of longitudinally and radially extending folds. The apparatus includes a frame, blower means, agitation means, suction means and a pair of rollers. With this construction, the blower means, agitation means, and suction means cooperate to loosen and remove dust accumulated in the folds of the perforate filter element during use for cleaning the generally cylindrical air filter with the apparatus.

The blower means forces air through the filter and the element in a direction opposite the direction of air and dust entering the housing during use of the filter. The blower means includes a nozzle having a pair of elongated lips defining an elongated air outlet parallel to the axis and adjacent the path of rotation of the housing for direct proximate exposure to narrow and elongated surface portions of one of the casings brought successively opposite the outlet as the housing is rotated. One of the elongated lips comprises a flexible seal projecting into the path of rotation of the one casing at the side of the outlet toward which the casing rotates. The seal is adapted to be flexed by the one casing in the direction of rotation thereof and to remain in surface sealing engagement therewith and the lips at all times are spaced apart in the direction of casing rotation.

The suction means is likewise provided for drawing air through the filter and the element in a direction opposite the direction of air and dust entering the housing during use of the filter. The suction means includes a nozzle having a pair of elongated lips defining an elongated air inlet parallel to the axis and adjacent the path of rotation of the housing for direct proximate exposure to narrow and elongated surface portions of the other of the casings brought successively opposite the inlet as the housing is rotated. One of the elongated lips comprises a flexible seal projecting into the path of the other casing at the side of the inlet toward which the casing rotates. The seal is adapted to be flexed by the other casing in the direction of rotation thereof and to remain in surface sealing engagement therewith and the lips at all times are spaced apart in the direction of casing rotation.

The frame supports the filter in position for rotation about the housing axis. The agitation means is operatively associated with the frame for loosening dust which entered the housing during use of the filter. A pair of rollers engages one of the casings to drive the filter for rotation about the housing axis.

In the disclosed embodiment, the elongated air outlet of the blower means nozzle preferably lies in the same plane facing the elongated air inlet of the suction means nozzle. The air flow through the blower and suction means nozzles is reversible to clean both in-to-out and out-to-in filter elements. The elongated air outlet of the blower means nozzle is spaced from and parallel to the elongated air inlet of the suction means nozzle. The air flow through the blower and suction means nozzles is provided simultaneously to assure thorough cleaning of filter elements. The elongated air outlet of the blower means nozzle is spaced at any of infinitely variable distances from the elongated air inlet of the suction means nozzle.

The method includes supporting the filter in position for rotation about the housing axis, forcing air through the filter and the element in a direction opposite the direction of air and dust entering the housing during use of the filter, agitating the filter and the element for loosening dust which entered the housing during use of the filter, drawing air through the filter and the element in a direction opposite the direction of air and dust entering the housing during use of the filter, and driving the filter for rotation about the housing axis.

The present invention therefore retains the advantages inherent in dry cleaning filter elements while at the same time providing an improved construction and operation that enhances the desirability of dry cleaning. It is therefore an object of the present invention to provide an apparaus and method for more effectively loosening and removing dust accumulated in an air filter element during use of the filter. The provision of the apparatus and method and the realization of the advantages to be derived therefrom constitute additional important objects of the present invention with still other objects being appreciated from a consideration of the details of construction and operation set forth in the accompanying specification, claims and drawings.

DRAWINGS

The invention is described in conjunction with the accompanying drawings, in which:

FIG. 1 is a front elevational view of the dry cleaning apparatus of the present invention;

FIG. 2 is a side elevational view of the dry cleaning apparatus of FIG. 1; and

FIG. 3 is a plan view of the dry cleaning apparatus of FIG. 1

DESCRIPTION

In the illustration given and with reference first to FIG. 1, the numeral 10 designates generally a dry cleaning apparatus in accordance with the present invention. The apparatus 10 includes a frame 11, blower means 12, agitation means 13, suction means 14 and (as shown in FIG. 2) a pair of rollers 15. With these features, the apparatus 10 is well suited for loosening and removing dust accumulated in a filter 16.

The filter 16 (as shown in FIG. 1) is generally cylindrical having a housing 17 with concentric inner and outer perforate shell casings 18 and 19, respectively, and a perforate filter element 20 contained between the casings 18 and 19 with an annular arrangement of longitudinally and radially extending folds (not shown). The frame 11 supports the filter 16 in position for rotation about the housing axis and the pair of rollers 15 are engageable with one of the casings such as 19 to drive the filter 16 for rotation about the housing axis. With these features, the blower means 12, agitation means 13, and suction means 14 cooperate to loosen and remove dust accumulated in the folds of the perforate filter element 20 during use for cleaning the generally cylindrical air filter 16 with the apparatus 10.

The blower means 12 is designed to force air through the filter 16 and the element 20 in a direction opposite the direction of air and dust entering the housing during use of the filter 16. It includes a nozzle 21 having a pair of elongated lips 21a and 21b (as shown in FIG. 2) defining an elongated air outlet parallel to the axis and adjacent the path of rotation of the housing 17 for direct proximate exposure to narrow and elongated surface portions of one of the casings such as 18 brought successively opposite the outlet as the housing 17 is rotated. One of the elongated lips such as 21a comprises a flexible seal projecting into the path of rotation of the one casing such as 18 at the side of the outlet toward which the casing rotates. The seal is adapted to be flexed by the one casing such as 18 in the direction of rotation thereof and to remain in surface sealing engagement therewith and the lips 21a and 21b at all times are spaced apart in the direction of casing rotation.

The suction means 14 is likewise designed to draw air through the filter 16 and the element 20 in a direction opposite the direction of air and dust entering the housing during use of the filter 16. It includes a nozzle 22 having a pair of elongated lips 22a and 22b (as shown in FIG. 2) defining an elongated air inlet parallel to the axis and adjacent the path of rotation of the housing 17 for direct proximate exposure to narrow and elongated surface portions of the other of the casings such as 19 brought successively opposite the inlet as the housing 17 is rotated. One of the elongated lips such as 22a comprises a flexible seal projecting into the path of rotation of the other casing such as 19 at the side of the inlet toward which the casing rotates. The seal is adapted to be flexed by the other casing such as 18 in the direction of rotation thereof and to remain in surface sealing engagement therewith and the lips 22a and 22b at all times are spaced apart in the direction of casing rotation.

The other of the elongated lips such as 21b and 22b comprise rigid seals. The rigid lips 21b and 22b of the nozzles of the blower and suction means 12 and 14, respectively, are formed of hard rubber. With respect to the flexible elongated lips 21a and 22a, a soft rubber is used.

The elongated air outlet of the blower means nozzle 21 lies in the same plane facing the elongated air inlet of the suction means nozzle 22. The air flow through the nozzles 21 and 22 is reversible to clean both in-to-out and out-to-in filter elements. The elongated air outlet of the blower means nozzle 21 is spaced from and parallel to the elongated air inlet of the suction means nozzle 22. The air flow through the nozzles 21 and 22 is provided simultaneously to assure thorough cleaning of filter elements. The elongated air outlet of the blower means nozzle 21 is spaced at any of infinitely variable distances from the elongated air inlet of the suction means nozzle 22.

The agitation means 13 is operatively associated with the frame 11 for loosening dust which entered the housing 17 during use of the filter 16. It includes a hinged frame-supporting platform 24 (as shown in FIG. 2) which is raised and lowered by spring loaded cylinder means 25 operating at a frequency of about 240 cycles per minute. The hinged platform 24 includes a trough 26 positioned under the frame 11 (as shown in FIG. 1) to catch dust loosened from the filter 16. The trough 26 is operatively associated with a vacuum means 27 to remove dust loosened from the filter by the agitation means 13.

The pair of rollers 15a and 15b are engageable with one of the casings such as 19 to drive the filter 16 for rotation about the housing axis. The frame 11 supports the rollers 15a and 15b and the rollers support the filter 16 in position. The rollers 15a and 15b are adjustably supported alongside the elongated air inlet of the suction means nozzle 22 being power driven by a motor 88.

Referring again to FIGS. 1 through 3, the structure of the apparatus 10 can be further understood. The blower means nozzle 21 and the suction means nozzle 22 are supported by the frame 11 in a generally horizontal position by a vertical support member 28 and brackets 29 and 30, respectively. The bracket 29 is slidably mounted on the vertical support member 28 (as shown in FIG. 2) thereby providing vertical adjustability being securable by means of a thumb screw 31. As a result, the vertical separation between the blower means nozzle 21 and the suction means nozzle 22 is infinitely variable to accommodate housings 17 of varying thicknesses.

The blower means nozzle 21 is operatively connected to a blower 32 supported within a cabinet 33 through a suitable flexible hose or conduit such as 34. The suction means nozzle 22 is likewise operatively connected to a vacuum 35 supported within the cabinet 33 through a suitable flexible hose or conduit such as 36. Both the blower 32 and the vacuum 35 are reversible so that they can function as a vacuum and a blower, respectively, to clean in-to-out as well as out-to-in filter elements.

The trough 26 is operatively associated with the vacuum 27 supported within the cabinet 33 through a suitable flexible hose or conduit such as 37 with a branch of the hose 38 extending through the table top or work surface 39 of the cabinet 33 to provide an auxiliary suction means for removing dust and dirt that might accumulate there during cleaning operations. The hose or conduit such as 34, 36, 37 and 38 link the blower means nozzle 21, the suction means nozzle 22, the trough 26 and the work surface 39, respectively, through the blower-vacuum 32, the vacuum/blower 35 and the vacuum 27 to a dust collector bag or bin (not shown) through a suitable exhaust hose or conduit such as 40 (as shown in FIG. 3). The apparatus 10 can therefore blow and suck dust from the filter 16 as well as loosen dust from the filter by agitation for collection of the removed dust at a single location.

The frame supporting platform 24 normally rests upon the table top or work surface 39 being hinged as at 41 (as shown in FIG. 2) and including an outwardly extending arm 42 (as shown in FIG. 3). The arm 42 rests upon the cylinder means 25 which causes the agitation as the cylinder means 25 raises and lowers the platform 24 at a frequency of approximately 240 cycles per minute. When the apparatus 10 is in operation, the entire frame supporting platform 24 drops against the table top or work surface 39 on the downward stroke to loosen dust which entered the housing 17 during use of the filter 16.

Another aspect of the present invention lies in a method of cleaning a generally cylindrical air filter. The filter can again have a housing with concentric inner and outer perforate shell casings and a perforate filter element contained between the casings with an annular arrangement of longitudinally and radially extending folds (not shown). The method comprises the steps of supporting the filter in position for rotation about the housing axis, forcing air through the filter and the element in a direction opposite the direction of air and dust entering the housing during use of the filter, the air being forced through narrow and elongated surface portions of one of the casings brought successively opposite the air as the housing is rotated, agitating the filter and the element for loosening dust which entered the housing during use of the filter, drawing air through the filter and the element in a direction opposite the direction of air and dust entering the housing during use of the filter, the air being forced through narrow and elongated surface portions of the other of the casings brought successively opposite the air as the housing is rotated, and driving the filter for rotation about the housing axis. With this combination of steps, dust accumulated in the folds of the filter element during use are loosened and removed to clean the generally cylindrical air filter with the method.

Cleaning of filters is accomplished by placing the filter 16 between the blower means nozzle 21 and the suction means nozzle 22 (as shown in FIG. 1) so that the outer perforate casing 19 rests upon the drive rollers 15a and 15b. The drive rollers can be adjusted by conventional means (not shown) so that the outer perforate casing 19 is seated against the elongated lips 22a and 22b of the suction means nozzle 22. The blower means nozzle 21 can then be vertically adjusted by loosening the thumb screws 31 and sliding the bracket 29 downward on the vertical support member 28 until the elongated lips 21a and 22b are likewise seated against the inner perforate casing 18. After these adjustments have been made, the air flow to and from the filter 16 is confined to a very narrow strip defined by the lips 21a, 21b and 22a, 22b and the apparatus 10 is ready to clean the filter 16.

With an out-to-in filter, the cleaning operation should be conducted in an in-to-out manner. The blower/vacuum 32 should therefore be set in a blower mode so that the blower means nozzle 21 will force air through the filter in an in-to-out manner. The vacuum/blower 35 should likewise be set in a vacuum mode so that the suction means nozzle 22 will draw air through the filter in an in-to-out manner. The flexible lips or blades 21a and 22a are then cut at the end of the filter 16 to allow the portions of the blades 21a and 22a beyond the filter 16 to close the slot in the nozzles 21 and 22 confining all of the blowing and sucking to the filter 16. The flexible lips or blades 21a and 22a may be cut as many times as necessary for different lengths of filters without affecting the blowing and sucking process. With the filter 16 in position depressing the flexible lips or blades 21a and 22a to bend outwardly so as to snugly wipe against the filter 16, the motor for the drive rollers 15a and 15b, the motors for the blower/vacuum 32, vacuum/blower 35 and vacuum 27 and the motor for the cylinder means 25 can be turned on to start the cleaning operation.

The present invention is therefore directed to an apparatus and method for cleaning a generally cylindrical air filter utilizing blower means and suction means operating simultaneously on both the inner and outer perforate shell casings of the filter wherein the flow can be reversed depending upon the type of filter being cleaned. Automatic agitation is provided at the rate of about 240 cycles per minute while the cleaning operation takes place utilizing a hinged platform with spring loaded cylinder means connected to an arm of the platform which causes the platform to raise with spring force and the weight of the platform forcing it downwardly. The filter is automatically rotated by a pair of drive rollers provided alongside the vacuum means nozzle and the apparatus is adapted for either fixed or mobile operation with the relative size of the components as well as their arrangement being dictated by the particular application. The blower means nozzle and the suction means nozzle therefore provide a push-pull air flow system in combination with agitation which assures very effective cleaning of a filter thereby accomplishing all of the objectives set forth and described hereinabove.

While in the foregoing specification a detailed description of the invention has been set forth for purposes of illustration, variations of the details herein given may be made by those skilled in the art without departing from the spirit and scope of the invention as set forth in the appended claims.

I claim:

1. A method of cleaning a generally cylindrical air filter having a housing with concentric inner and outer perforate shell casings and a perforate filter element contained between the casings with an annular arrangement of longitudinally and radially extending folds, wherein the method comprises supporting the filter in position for rotation about the housing axis, forcing air through the filter and the element in a direction opposite the direction of air and dust entering the housing during use of the filter, the air being forced through narrow and elongated surface portions of one of the casings brought successively opposite the air as the housing is rotated, agitating the filter and the element for loosening dust which entered the housing during use of the filter as the housing is rotated, drawing air through the filter and the element in a direction opposite the direction of air and dust entering the housing during use of the filter, the air being drawn through narrow and elongated surface portions of the other of the casings brought successively opposite the air as the housing is rotated, and driving the filter for rotation about the housing axis whereby the forcing, agitating and drawing steps cooperate to loosen and remove dust accumulated in the folds of the perforate filter element during use for cleaning the generally cylindrical air filter.

2. The method of claim 1 in which the agitation step operates at a frequency of about 240 cycles per minute.

3. An apparatus for cleaning a generally cylindrical air filter having a housing with concentric inner and outer perforate shell casings and a perforate filter element contained between the casings with an annular arrangement of longitudinally and radially extending folds, wherein the apparatus comprises a frame to support the filter in position for rotation about the housing axis, blower means for forcing air through the filter and the element in a direction opposite the direction of air and dust entering the housing during use of the filter, the blower means including a nozzle having a pair of elongated lips defining an elongated air outlet parallel to the axis and adjacent the path of rotation of the housing for direct proximate exposure to narrow and elongated surface portions of one of the casings brought successively opposite the outlet as the housing is rotated, one of the elongated lips comprising a flexible seal projecting into the path of rotation of the one casing at the side of the outlet toward which the casing rotates, the seal being adapted to be flexed by the one casing in the direction of rotation thereof and to remain in surface sealing engagement therewith and the lips at all times being spaced apart in the direction of casing rotation, agitation means operatively associated with the frame for loosening dust which entered the housing during use of the filter, suction means for drawing air through the filter and the element in a direction opposite the direction of air and dust entering the housing during use of the filter, the suction means including a nozzle having a pair of elongated lips defining an elongated air inlet parallel to the axis and adjacent the path of rotation of the housing for direct proximate exposure to narrow and elongated surface portions of the other of the casings brought successively opposite the inlet as the housing is rotated, one of the elongated lips comprising a flexible seal projecting into the path of rotation of the other casing at the side of the inlet toward which the casing rotates, the seal being adapted to be flexed by the other casing in the direction of rotation thereof and to remain in surface sealing engagement therewith and the lips at all times being spaced apart in the direction of casing rotation, and a pair of rollers engageable with one of the casings to drive the filter for rotation about the housing axis whereby the blower means, agitation means and suction means cooperate to loosen and remove dust accumulated in the folds of the perforate filter element during use for cleaning the generally cylindrical air filter with the apparatus.

4. The apparatus of claim 3 in which the other of the elongated lips of the blower means nozzle comprises a rigid seal and also the other of the elongated lips of the suction means nozzle comprises a rigid seal.

5. The apparatus of claim 4 in which the rigid lips of the blower and suction means nozzles are formed of hard rubber and the flexible lips of the blower and suction means nozzles are formed of soft rubber.

6. The apparatus of claim 3 in which the elongated air outlet of the blower means nozzle lies in the same plane facing the elongated air inlet of the suction means nozzle.

7. The apparatus of claim 6 in which the elongated air outlet of the blower means nozzle is spaced from and parallel to the elongated air inlet of the suction means nozzle.

8. The apparatus of claim 7 in which the elongated air outlet of the blower means nozzle can be spaced at infinitely variable distances from the elongated air inlet of the suction means nozzle.

9. The apparatus of claim 3 includes means for receiving the air flow through the blower and suction means nozzles.

10. The apparatus of claim 3 includes means for providing the air flow through the blower and suction means nozzles simultaneously.

11. The apparatus of claim 3 in which the agitation means comprises a hinged frame-supporting platform which is raised and lowered by a spring loaded cylinder means.

12. The apparatus of claim 11 in which the hinged platform includes a trough to catch dust loosened from the filter by the agitation means.

13. The apparatus of claim 12 in which the trough includes vacuum means to remove dust loosened from the filter by the agitation means.

14. The apparatus of claim 3 in which the frame supports the rollers and the rollers support the filter in position for rotation about the housing axis.

15. The apparatus of claim 14 in which the rollers are supported alongside the elongated air inlet of the suction means nozzle.

16. The apparatus of claim 3 includes means for adjusting the rollers.

17. The apparatus of claim 3 includes motor means for driving the rollers.

* * * * *